UNITED STATES PATENT OFFICE.

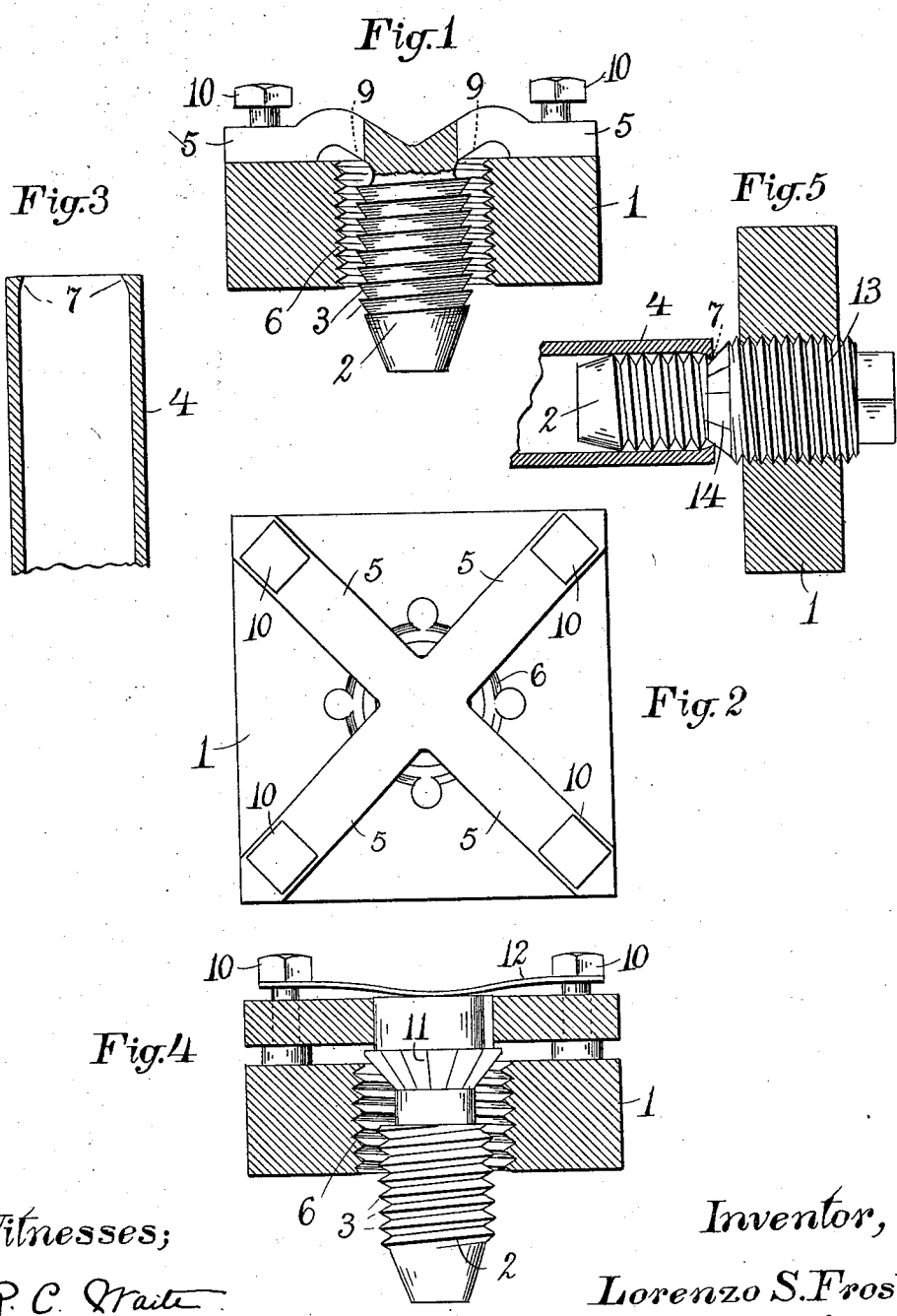

LORENZO S. FROST, OF CAMBRIDGE, MASSACHUSETTS.

PIPE THREADING AND REAMING DEVICE.

1,026,668.

Specification of Letters Patent. Patented May 21, 1912.

Application filed March 30, 1911. Serial No. 617,843.

*To all whom it may concern:*

Be it known that I, LORENZO S. FROST, a citizen of the United States, and a resident of Cambridge, in the county of Middlesex and Commonwealth of Massachusetts, have invented certain new and useful Improvements in Pipe Threading and Reaming Devices, of which the following is a specification.

The object of this invention is the construction of a device for plumbers and pipe-fitters by means of which a pipe-end can be threaded even if it projects but an inch or so from a wall; by means of which to ream out the end of the pipe and so remove the bur left therein when the section of piping is cut off from the remainder; whereby the die is guided onto the pipe-end without danger of its getting untrue, and the effecting of certain other improvements in detail of construction hereinafter set forth.

Referring to the drawings forming part of this specification, Figure 1 is a central section of a die and guide embodying my invention. Fig. 2 is a plan view of the same. Fig. 3 is a longitudinal section of a pipe-end showing the bur to be removed. Fig. 4 is a central section of another form of the invention. Fig. 5 is a similar section of another form thereof.

In each case, the die 1 is of usual construction; in Fig. 1, such die being shown as provided with a cylindrical threaded guide 2 the points of whose threads 3 are disposed to just fit within the pipe 4 and not to cut into the same. This guide is formed at its upper end with a plurality of arms 5, preferably four, curved over at substantially right angles to the axis of said guide, and riveted or otherwise held upon the surface of the die. Said threads 3 are made ratchet-shaped, with their horizontal faces uppermost, and are fewer to the inch than are the cutting threads 6 of the die. The end of said guide being somewhat tapered, the same is forced within the end of the pipe to be threaded, until its threads 3 engage the bur 7 of said pipe and will screw the guide therein. By the time the end of the pipe is in contact with the die, said guide is in perfect alinement with the axis of the pipe and the die is consequently applied to the pipe at exact right angles thereto. Now, as the die is forced to its task of threading the exterior of the pipe, it will cut the desired threads thereon perfectly true. After the die has progressed a sufficient distance along the pipe to have cut three or four threads thereon, the difference in pitch between the same and the threads on the guide will cause the sharp edges of the latter to begin shearing off the bur 7. By the time the pipe has been nearly threaded, such bur is entirely gone. By continuing the thread-cutting until the end of the pipe is reached, the cutting edges 9 formed beneath the arms 5 will perform the function of a reamer to bevel more or less the inner edge of the pipe-end, the rivets or bolts 10 which hold said arms to the die being made long enough to allow a limited vertical play of the die relative to said arms. This permits the die to descend in cutting a final thread while the reaming edges 9 cut a uniform bevel. The die and guide are unscrewed and removed from the pipe in the usual manner.

The construction of die 1 shown in Fig. 4 does not differ from that already referred to, but the guide and reamer are unlike what has been above described, in having the threads on the guide of usual construction and of same pitch as those of the die. The reamer 11 is of usual form, but formed as a part of the guide. The latter should also be adapted for a longitudinal play relative to the die, as by the bolts 10, to permit the reamer to form a smooth bevel while the die descends during its rotation. A spring or springs 12 may be provided for giving the reamer required working pressure, as shown in Fig. 1 as well as Fig. 4.

In the form of my invention illustrated in Fig. 5, the die 1 is not attached to the guide and reamer, but is made to turn easily upon a suitably threaded head 13 formed on said guide. The guide 2 may be given any desired pitch of thread, provided it fits snugly within the pipe. Between the head 13 and threads of the guide is the reamer 14 for beveling the inner edge of the pipe. In using this device, the guide is first screwed down within the pipe-end, its threads engaging the bur 7 as in the other forms of the invention, until the reamer 14 has about reached said bur. Then the die is applied to the head 13,—if not already on,—and is screwed off therefrom to the pipe until the latter is fully threaded and the die is possibly entirely out of engagement with said head. The guide is now rotated, with a suitable inward pressure, until the reamer 14 has performed its task. This having removed substantially all the bur, the guide may be withdrawn directly, and then the die unscrewed from the pipe.

It will be noted that in each form of my invention, the bur within the pipe-end is made the means for enabling the guide to be screwed into the pipe, and that after it has served its purpose it is removed, either by the reamers of the construction illustrated by Figs. 4 and 5, or by the shearing action of the sharp threads 3 in addition to the reamer as shown in Fig. 1. By having the points of the threads 3 snugly fit within the pipe, the die is in each case made to stand at exact right angles to the pipe and so cut true threads thereon.

It should be noted that in each of the forms of my invention the engagement of the threads of the guide with the bur in the pipe enables such guide to draw the die into its thread-cutting action, so that the pipe-fitter needs only to rotate the die and does not require to laboriously press the die forward onto the pipe-end. In case the pipe-end has been sawed off and therefore has no bur, the guide will freely enter the same and will perform its guiding action for the die, but not the feeding therefor. For such piping, consequently, a smooth and unthreaded guide will serve this desired function, provided it fits the pipe snugly.

What I claim as my invention and for which I desire Letters Patent is as follows, to wit:—

1. The combination with a pipe die, of a guide for the same formed with threads adapted to loosely fit within the pipe for which said die is designed and to engage the bur usually existing in the pipe-end, one face of said threads being at right angles to the axis of said guide, and the pitch of said threads being unequal to the pitch of the internal threads of said die.

2. The combination with a pipe die, of a guide for the same formed with ratchet-shaped screw threads adapted to loosely fit within the pipe for which said die is designed and to engage the bur usually existing in the pipe-end, the threads in the die being slightly more numerous per inch than are those of the guide.

3. The combination with a pipe die, of a terminally tapered cylindrical guide having threads fitted to the pipe for which said die is designed, and a reamer at the upper end of the guide, said guide being adapted to hold the die for proper presentation to the pipe.

4. The combination with a pipe die, of a threaded guide fitted to enter the pipe for which the die is designed, a reamer above the threaded part of the guide, and means for holding the die at right angles to the guide and permitting relative longitudinal movement of the guide and die.

In testimony that I claim the foregoing invention, I have hereunto set my hand this 28th day of March, 1911.

LORENZO S. FROST.

Witnesses:
A. B. UPHAM,
ALEX. I. PECKHAM.

---

Copies of this patent may be obtained for five cents each, by addressing the "Commissioner of Patents, Washington, D. C."